US009015702B2

(12) United States Patent
Bhat

(10) Patent No.: US 9,015,702 B2
(45) Date of Patent: Apr. 21, 2015

(54) DETERMINING COMPATIBILITY OF AN APPLICATION WITH DIFFERENT VERSIONS OF AN OPERATING SYSTEM

(76) Inventor: Vasanth Bhat, Bangalore (IN)

(*) Notice: Subject to any disclaimer, the term of this patent is extended or adjusted under 35 U.S.C. 154(b) by 108 days.

(21) Appl. No.: 13/349,590

(22) Filed: Jan. 13, 2012

(65) Prior Publication Data

US 2013/0185708 A1  Jul. 18, 2013

(51) Int. Cl.
*G06F 9/445* (2006.01)
*G06F 9/45* (2006.01)
*G06F 9/00* (2006.01)

(52) U.S. Cl.
CPC .................................. *G06F 9/44552* (2013.01)

(58) Field of Classification Search
CPC ................ G06F 8/65; G06F 8/67; G06F 8/71
See application file for complete search history.

(56) References Cited

U.S. PATENT DOCUMENTS

| | | | | |
|---|---|---|---|---|
| 6,971,093 B1* | 11/2005 | Spring | ........................... | 717/170 |
| 7,117,504 B2* | 10/2006 | Smith et al. | ..................... | 719/328 |
| 7,490,268 B2* | 2/2009 | Keromytis et al. | ........ | 714/38.11 |
| 7,555,757 B2* | 6/2009 | Smith et al. | ..................... | 719/328 |
| 7,610,316 B2* | 10/2009 | Bartz et al. | ..................... | 707/203 |
| 7,752,616 B2* | 7/2010 | Marolia et al. | ................. | 717/169 |
| 7,788,314 B2* | 8/2010 | Holt | ............................... | 709/201 |
| 7,802,082 B2* | 9/2010 | Kruse et al. | ....................... | 713/1 |
| 7,805,722 B2* | 9/2010 | Mori et al. | ..................... | 717/178 |
| 7,984,435 B2* | 7/2011 | Kokkinen | ..................... | 717/170 |
| 8,219,983 B1* | 7/2012 | Sobel et al. | .................... | 717/168 |
| 2001/0014968 A1* | 8/2001 | Mohammed | ..................... | 717/11 |
| 2003/0229890 A1* | 12/2003 | Lau et al. | ....................... | 717/168 |
| 2005/0268296 A1* | 12/2005 | Marolia et al. | ................. | 717/168 |
| 2008/0120129 A1* | 5/2008 | Seubert et al. | ..................... | 705/1 |
| 2011/0169844 A1* | 7/2011 | Diard et al. | .................... | 345/522 |
| 2011/0202905 A1* | 8/2011 | Mahajan | ...................... | 717/140 |
| 2012/0011513 A1* | 1/2012 | McConaughy et al. | ....... | 718/100 |
| 2012/0227061 A1* | 9/2012 | Hunt et al. | ..................... | 719/331 |

* cited by examiner

*Primary Examiner* — Don Wong
*Assistant Examiner* — Mohammad Kabir
(74) *Attorney, Agent, or Firm* — Narendra Reddy Thappeta

(57) ABSTRACT

An aspect of the present invention detects usage, by an application process, of a utility provided by a first version of an operating system, and determines whether a later version of the operating system is incompatible with identical usage of the detected utility. If the usage is determined to be incompatible, the corresponding information on the incompatibility is included in a report. According to another aspect, the determination of compatibility is performed by maintaining data (e.g., in a database) indicating incompatibility information related to a set of utilities, which are incompatible with the second version. The data is examined to determine incompatibility. The features are disclosed as being applied with respect to dynamically linked libraries, dynamically loaded libraries, functions, fonts, etc.

21 Claims, 6 Drawing Sheets

```
#pragma D option quiet
#pragma D option bufsize=16m
#pragma D option aggsize=2m
pragma D option switchrate=100hz 410 →  pid1886:libglib-2.0.so.0.400.1::entry,
       pid1886:libgobject-2.0.so.0.400.1::entry,
       pid1886:libfreetype.so.6::entry,
       pid1886:libXrender.so.1::entry,
420 →  pid1886:libblueprint.so::entry,
       pid1886:libORBitCosNaming-2.so.0.0.0::entry,
430 →  pid1886:im-xim.so::entry,
       pid1886:pango-basic-fc.so::entry,
440 →  pid1886:libpixbufloader-png.so::entry
441 →  {
442 →  @MisLib_1886["MisLib",pid,probemod,probefunc]=count();
443 →  }

450 →  pid1886:libc.so.1::entry
460 →  {
       @Symbol_1886["Symbol",pid,probemod,probefunc]=count();
       }

470 →  pid1886:libCrun.so.1::entry
471 →  /probefunc == "__1cH__CimplWnew_atexit_implemented6F_b_" || probefunc == "__1cH__CimplPsimulate_atexit6FpG_v_i_" ||
472 →  probefunc == "__1cH__CimplWsimulate_exit_handlers6Fpv1_v_"/
473 →  {
474 →  @Symbol_1886["Symbol",pid,probemod,probefunc]=count();
475 →  }
```

FIG. 4

List of Oracle Solaris 11 compatibility issues
510 → ERROR - The Library "/usr/lib/gtk-2.0/2.4.0/engines/libblueprint.so" is no longer available in Oracle Solaris 11
520 → ERROR - The Library "/usr/lib/gtk-2.0/2.4.0/loaders/libpixbufloader-png.so" is no longer available in Oracle Solaris 11
530 → ERROR - The Library "/usr/lib/gtk-2.0/2.4.0/immodules/im-xim.so" is no longer available in Oracle Solaris 11
ERROR - Some Symbols from "/usr/openwin/lib/libXft.so.2" are no longer available in Oracle Solaris 11
540 → ERROR - Some Symbols from "/lib/libc.so.1" are no longer available in Oracle Solaris 11
ERROR - Some Symbols from "/usr/openwin/lib/libX11.so.4" are no longer available in Oracle Solaris 11
WARNING - The Font "/usr/openwin/lib/locale/ar/X11/fonts/TrueType/SHAYMT.ttf" is no longer available in Oracle Solaris 11
WARNING - The Library "/usr/lib/libglib-2.0.so.0.400.1" is no longer available in Oracle Solaris 11
WARNING - The Library "/usr/lib/libgobject-2.0.so.0.400.1" is no longer available in Oracle Solaris 11
WARNING - The Library "/usr/sfw/lib/libfreetype.so.6" is no longer available in Oracle Solaris 11
WARNING - The Library "/usr/openwin/sfw/lib/libXrender.so.1" is no longer available in Oracle Solaris 11
WARNING - The Library "/usr/lib/libgthread-2.0.so.0.400.1" is no longer available in Oracle Solaris 11
WARNING - The Font "/usr/openwin/lib/X11/fonts/TrueType/dotum.ttf" is no longer available in Oracle Solaris 11
WARNING - The Library "/usr/lib/libORBit-2.so.0.0.0" is no longer available in Oracle Solaris 11
WARNING - The Library "/usr/lib/libgdk-x11-2.0.so.0.400.9" is no longer available in Oracle Solaris 11
WARNING - The Library "/usr/lib/libgtk-x11-2.0.so.0.400.9" is no longer available in Oracle Solaris 11
WARNING - The Library "/usr/lib/libgdk_pixbuf-2.0.so.0.400.9" is no longer available in Oracle Solaris 11
WARNING - The application is using Private symbols from the Library "/lib/libnsl.so.1"
WARNING - The application is using Private symbols from the Library "/lib/libc.so.1"
WARNING - The application is using Private symbols from the Library "/usr/openwin/lib/libX11.so.4"

*FIG. 5*

DETERMINING COMPATIBILITY OF AN APPLICATION WITH DIFFERENT VERSIONS OF AN OPERATING SYSTEM

BACKGROUND OF THE INVENTION

1. Technical Field

The present disclosure relates to compatibility checking in computing systems, and more specifically to determining compatibility of an application with different versions of an operating system.

2. Related Art

Operating systems generally refer to programs that control access to various hardware resources present in a computing system. An operating system typically provides various interfaces (typically as libraries, functions, etc.), which are invoked by the applications that may share the hardware resources. Operating systems are typically loaded and executed soon after the corresponding computing systems are booted (powered on). The operating systems thereafter provide a run-time environment in which different applications can be executed.

Several versions of a same operating system (OS) often exist. Typically, a newer version of an OS is designed to provide more functionality (or for other reasons, such as fixing known bugs, enhanced resource usage efficiency, etc.), compared to a older version. In such newer versions, the interfaces and other utilities (e.g., directory structure, fonts, etc.) provided to applications, may differ from those provided by other (e.g., older) versions of the OS. In general, a utility refers to any facility provided by the OS to the applications for coordinating usage of hardware resources, organization of data according to pre-defined conventions, etc.

Hence, a same application designed for proper operation with one version of an operating system may not operate properly (i.e., may not be compatible) with another version of the operating system. Determination of compatibility of an application with different versions of an operating system is therefore desirable. For example, application vendors would benefit from information on changes required in their applications to ensure proper operation on a newer version of an OS.

BRIEF DESCRIPTION OF THE DRAWINGS

Example embodiments of the present invention will be described with reference to the accompanying drawings briefly described below.

FIG. 4 depicts a portion of a script used for registering libraries and functions, for monitoring by an operating system, in an embodiment.

FIG. 5 depicts portion of a report of compatibility information, in an embodiment.

In the drawings, like reference numbers generally indicate identical, functionally similar, and/or structurally similar elements. The drawing in which an element first appears is indicated by the leftmost digit(s) in the corresponding reference number.

DETAILED DESCRIPTION OF THE INVENTION

1. Overview

An aspect of the present invention detects usage, by an application process, of a utility provided by a first version of an operating system, and determines whether a later version of the operating system is incompatible with identical usage of the detected utility. If the usage is determined to be incompatible, the corresponding information on the incompatibility is included in a report.

According to another aspect, the determination of compatibility is performed by maintaining data (e.g., in a database) indicating incompatibility information related to a set of utilities, which are incompatible with the second version. The data is examined to determine incompatibility.

Another aspect of the present invention facilitates determination of compatibility with respect to libraries, by using an operating system designed to trap invocation of a library upon registration of the library for monitoring. Such a feature is used to determine compatibility issues with libraries, which are linked dynamically during run-time. In one embodiment, a set of dynamically linked libraries is identified. The data in the database is examined to determine a subset of libraries which are not supported by a later version. Each of such libraries is registered for monitoring by the operating system and if any function of the library is invoked, the corresponding information is included in the report.

Another aspect of the present invention facilitates determination of compatibility with respect to specific functions (of otherwise supported libraries). The data in the database is examined to determine specific ones of such functions (of libraries marked for potential use) indicated to be incompatible, and the determined functions are registered with the operating system for monitoring. If any of such functions are invoked, the corresponding information is also included in the report.

Several aspects of the present invention are described below with reference to examples for illustration. However, one skilled in the relevant art will recognize that the invention can be practiced without one or more of the specific details or with other methods, components, materials and so forth. In other instances, well-known structures, materials, or operations are not shown in detail to avoid obscuring the features of the invention. Furthermore, the features/aspects described can be practiced in various combinations, though only some of the combinations are described herein for conciseness.

2. Example Environment

Figure 1:
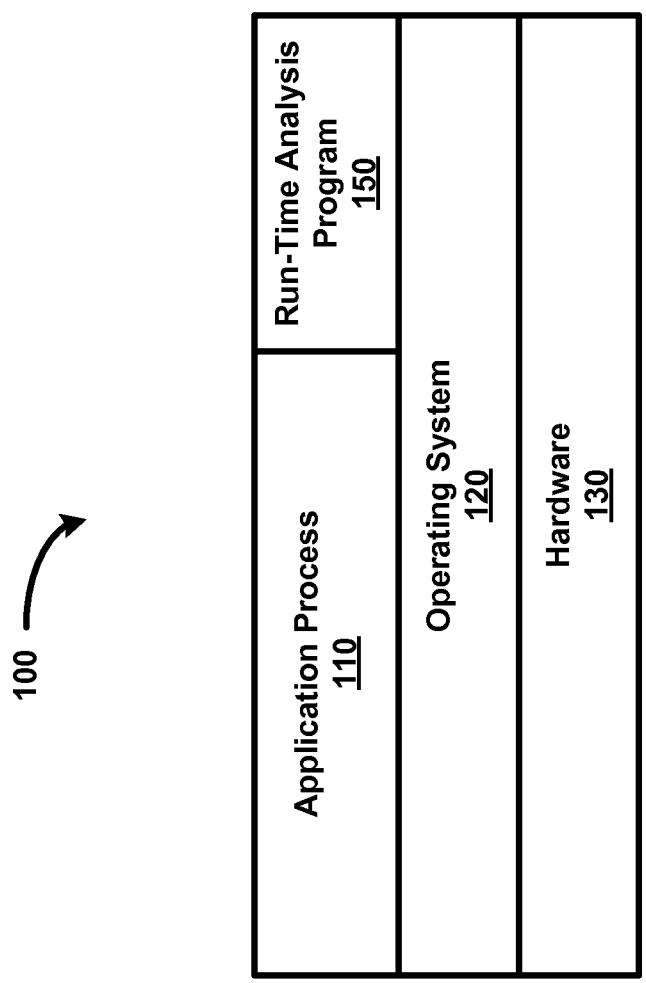
FIG. 1 is a block diagram illustrating the details of a computing system in which several features of the present invention are implemented.

FIG. 1 is a block diagram illustrating the details of an example system in which several aspects of the present invention can be implemented. Computing system 100 is shown containing hardware 130, OS 120, application process 110 and run-time analysis module 150. The details of computing system 100 are shown merely by way of illustration, and computer system 100 may contain other blocks as well.

Hardware 130 represents the hardware components (e.g., central processing unit, memory, bus controllers, hardware resources such as printer interface, serial interfaces, network interfaces, etc.) of computing system 100. The hardware components can be shared among various user applications, which are possibly distributed across multiple computing systems as well.

Application process 110 represents a user application that is presently executing in computing system 100. As may be readily appreciated, a user application is generally represented in the form of executable modules, which when executed, creates the corresponding application process. The application process represents an active entity capable of performing various actions (for which the corresponding user application is designed). Though only a single process is shown in FIG. 1 for illustration, it should be appreciated that many application processes (related to same or different user applications) may be executed simultaneously and/or in multi-tasking fashion, based on hardware 130.

OS 120 controls access of application processes to the various utilities. In case of functions (assumed to be same as procedures), the appropriate function call (e.g., requests for writing data to and reading data from memory in the form of file commands) is made by the application process and the invoked function contains the instructions that operate to access the resource on behalf of the application. In general, OS 120 provides interfaces (e.g., in the form application programmer's interface or API) to enable application process 110 to use the resources provided in hardware 120. The API typically is provided in the form of various function (or procedure) calls that can be invoked by application process 110.

As noted above, an operating system may have several versions, and OS 120 represents one such version. Thus, while application 110 may (currently) be executing in conjunction with such one version of OS 120 in computing system 100, it may be desirable to determine compatibility of application 110 with another version of the operating system (which is currently not executing in system 100, but which can replace the current version in system 100).

Run-time analysis module 150 operates to determine compatibility of application 110 with other versions of OS 120 (other than the currently executing version) according to several aspects of the present invention, as illustrated with some examples in sections below.

3. Determining Compatibility

Figure 2:
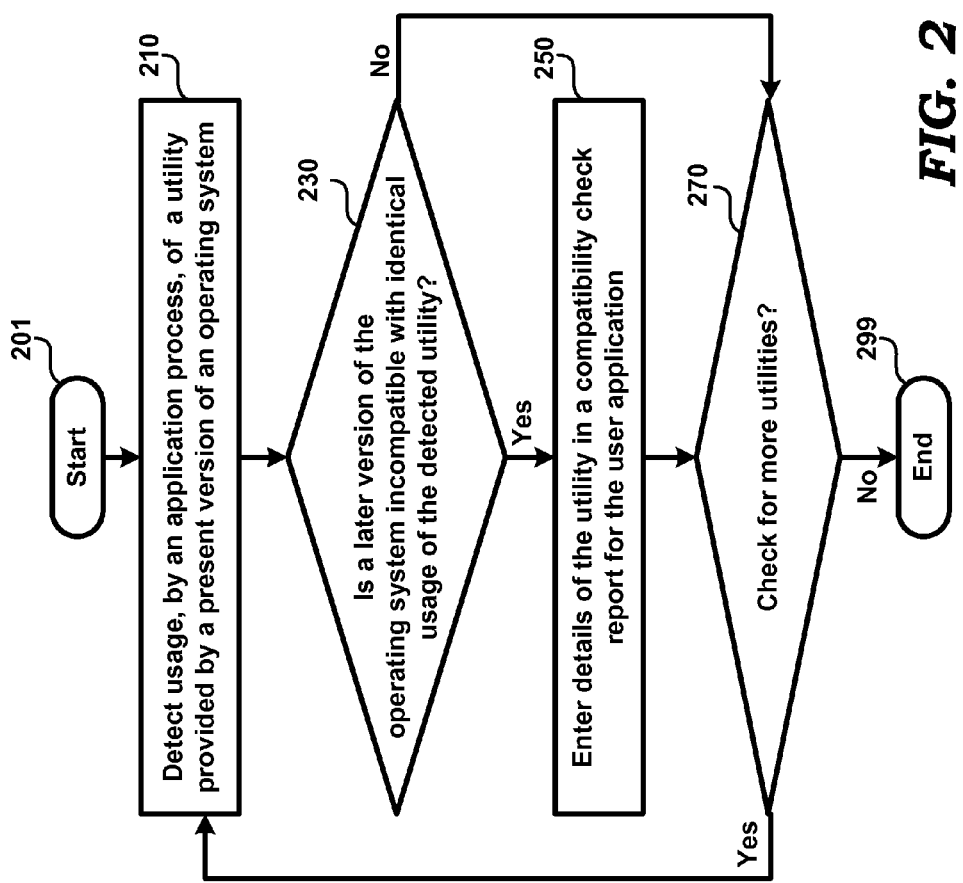
FIG. 2 is a flow chart illustrating the manner in which compatibility of an application with different versions of an operating system is determined in an embodiment.

FIG. 2 is a flowchart illustrating the manner in which compatibility of a user application with another (here, later or newer, for illustration) version of an operating system, in an embodiment. The flowchart is described with respect to the blocks of FIG. 1 merely for illustration. However, many of the features can be implemented in other environments also without departing from the scope and spirit of several aspects of the present invention, as will be apparent to one skilled in the relevant arts by reading the disclosure provided herein. The flow chart begins in step 201, in which control immediately passes to step 210.

In step 210, run-time analysis program 150 detects usage, by application process 110, of a utility provided by (executing/present version of) OS 120. Detection of invocation by an application process implies that such detection is performed during execution time of the application process. The utility can be a file, a function in a library, a font setting, etc, as noted above. In case of functions, the usage is initiated by invocation of the corresponding function call by pre-specified interface/convention. In case of directories, the usage is when the content of the directory is sought to be accessed. Similarly, in case of fonts type resources also, the usage occurs when data representing the font is accessed. Any approach to such detection (during the run-time of the application process) may be employed, though example embodiments are described in sections below for illustration. Control then passes to step 230.

In step 230, run-time analysis program 150 determines whether a later version of the operating system is incompatible with identical usage of the detected utility. An incompatibility is said to exist if the utility cannot be invoked using the same syntax/semantics and/or the effect/result is not suitable/same for the newer version. For example, in case of function calls, functions may not exist, or such usage may differ in the invocation and/or the effect (result) provided by execution of the function In case of libraries the library may not exist, upgraded to a newer version or moved to a different location. In case of directories, the directory may not exist in later versions or located at a different path. In case of fonts, font support may be discontinued or different file names may be used for the same path. Thus, the determination (during runtime) can depend on the type of utility, and any facility provided within the operating/execution environment of computing system 100 can be suitably used.

Control passes to step 250 if there is incompatible, and to step 270 otherwise. In step 250, run-time analysis program 150 records the details of the utility in a compatibility check report for application process 110 (or the corresponding user application). Control then passes to 270.

In step 270, run-time analysis program 150 determines if a compatibility check needs to be performed for at least one more utility. If a compatibility check needs to be performed for one more utility, control then passes to step 220, otherwise control passes to step 299, in which the flowchart ends.

Run-time analysis program 150 thus provides information indicating potential incompatibilities of an application with other versions of an operating system. The approaches described above can be implemented in several forms, an example of which is described in sections below.

4. Example Implementation

Figure 3B:
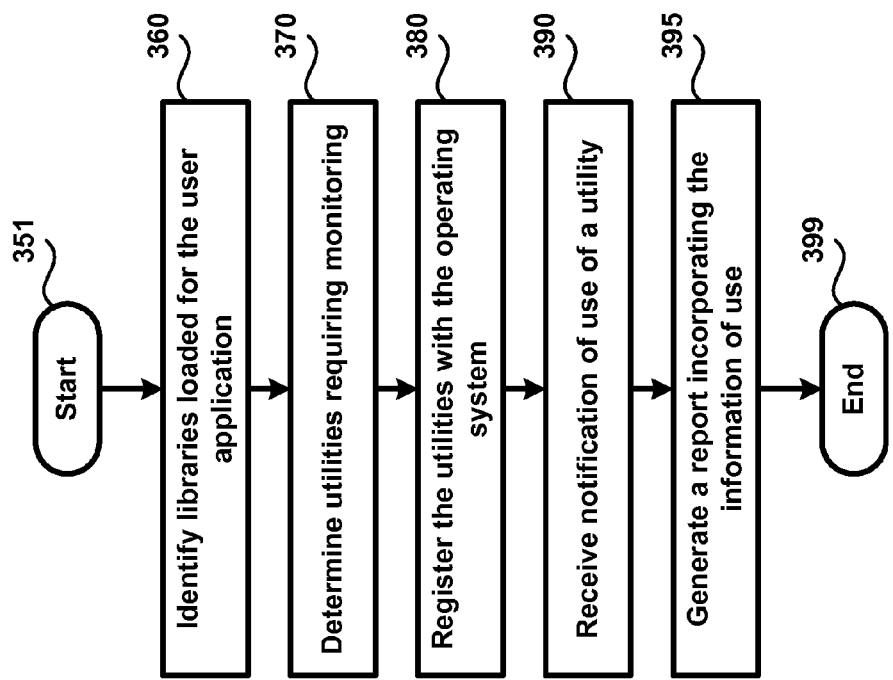
FIG. 3B is a flowchart illustrating the operation of run-time analysis program in an embodiment.
Figure 3A:
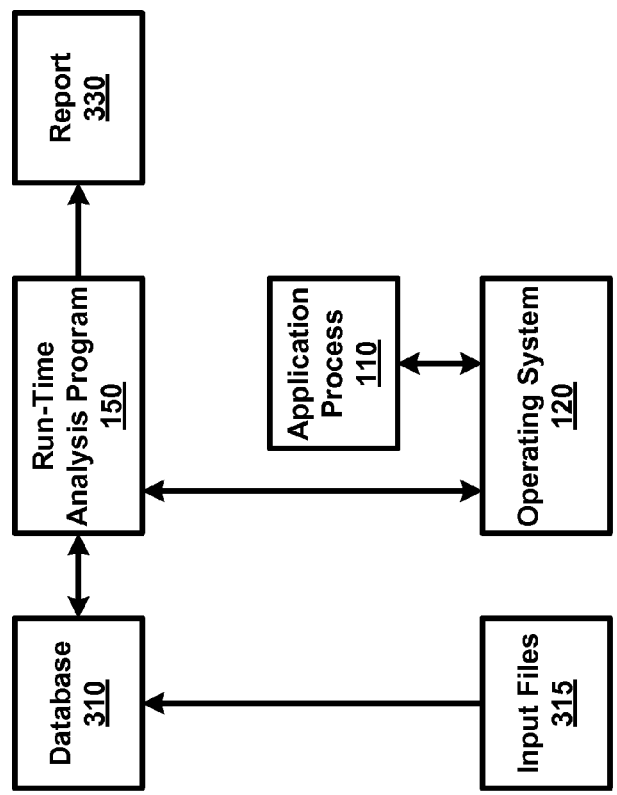
FIG. 3A is a block diagram illustrating the various components of a computing system in an embodiment.

FIG. 3A is a block diagram illustrating the details of implementation of at least some of the features described above, in an embodiment of the present invention. Some of the blocks of FIG. 1 are shown repeated to illustrate the interactions between the various blocks. FIG. 3A is thus shown containing application process 110, OS 120, run-time analysis program 150, database 310, input files 315 and report 330. Each block is described below in further detail.

Input files 315 contains data specifying the incompatibility in the usage of various utilities between those in the current/executing version of OS 120 and the newer version of the OS 120. The details of input files 315 in an embodiment of the present invention are described in a section below.

Database 310 stores the data specified in input files 315, and responds with specific data when presented with corresponding queries. Thus, queries are received specifying a detected utility (of step 210) and database 310 provides a response containing an indication of any incompatibility in the usage of the corresponding utility. The data in input files 315 can be examined for equivalent information, but querying database 310 provides a more efficient interface, as will be apparent to a skilled practitioner.

Run-time analysis program 150 interacts with OS 120 to determine specific utilities invoked by application process 110. Run-time analysis program 150 further queries database 310 to determine any incompatibilities in the usage of the corresponding utilities. Report 330 is generated based on such incompatibilities. It should be appreciated that run-time analysis program 150 may be executed prior to or after start of execution of application process 110. The description is continued with respect to input files in an example environment.

5. Input Files

In an embodiment, input files 315 contains the following data, and each item of below may be organized as a corresponding table in database 310 (accordingly data and table are used interchangeably). In addition, the description is provided assuming that the executing version is Oracle Solaris 10.0 and later version of interest is version 11, merely for illustration. It should be however appreciated that the invention can be implemented in conjunction with various other operating systems, provided by different vendors. Some of input files are noted below:

1) Missing Files: The table contains the details about the those files (Libraries, fonts, configuration files, etc.), which are found in OS 120 but are not available or moved to a different location in a later version of the OS.

2. Missing Symbols: The table contains the details of the Symbols (Functions) which are available in Oracle Solaris 10 but no longer available in Oracle Solaris 11

3. Modified Files: The table contains the list of Libraries (stored as files) in Oracle Solaris 10 version operating system, which have been modified/upgraded or moved to a different location (i.e., to a directory of a different path) in Oracle Solaris 11. The table provides the link between the existing file on Oracle Solaris 10 and it's equivalent on Oracle Solaris 11. Report 330 may accordingly contain information on the modified files if a corresponding file is sought to be accessed in the earlier version.

4. Modified Symbols: The table contains the details about the Symbols (Functions) from Libraries that have either changed in signature (i.e., invocation convention such as parameters, type of parameters, etc.) or in behavior (i.e., the effect provided by execution of the function) on Oracle Solaris 11.

5. Private Symbols: The table contains the private (undocumented and internal) symbols (Functions) of Libraries in Oracle Solaris 10 which may be removed in future versions of Oracle Solaris and hence shouldn't be used by the applications. Report 330 may accordingly contain use of any such private symbols in the operation of the earlier version of the operating system, such that a vendor of later version can take appropriate measures.

6. Deprecated symbols: The table contains the symbols (Functions) of Libraries in Oracle Solaris 10 which are marked for removal in the upcoming releases of Oracle Solaris 11. These help in detecting those applications that are using such functions and provide a suitable warning.

7. Missing Packages: This table contains details about Oracle Solaris 10 (earlier version) packages, which are no longer available in Oracle Solaris 11 (later version). As is well known in the relevant arts, a user application is shipped in the form of multiple packages, and a utility may be present in one of such packages. It is often possible that an entire package is not shipped in the later version, and accordingly tables are maintained indicating the specific packages not shipped, as well as utilities within such missing packages, which are not supported in the later version. The report generated may accordingly indicate the missing package information if a corresponding (contained) utility is not supported by the later version.

8. Modified Packages: This table provides a link between the modified packages on Oracle Solaris 10 and it's equivalent on Oracle Solaris 11. A package may be said to be modified, if there is a change (removal, addition, or change to signature or behavior) to at least one utility in the (modified) package, in relation to the corresponding package of the later (or newer) version of the operating system. Report 330 may accordingly indicate the identity/name of the modified package when a corresponding utility is detected to be changed, compared to use in the previous version of the operating system.

9. Modified SymLinks: The table provides details about "Symbolic Links" in Oracle Solaris 10 whose destinations have changed in Oracle Solaris 11. As is well known, a symbolic link provides a convenient convention by which a file in one directory ("physical directory") can be conveniently referred to in another directory (or with a different name) by specifying appropriate links (symbolic link) in the referring directory. A symbolic link is said to be modified if it refers to a different location, has changed name/directory, or is removed altogether.

It may thus be assumed that database 310 contains tables corresponding to information such as that described above. The manner in which such information can be used in generating report 330 in an example embodiment, is described below in detail. Some of the underlying concepts in such example embodiment are first established.

6. Underlying Concepts Related to Example Embodiment

In an embodiment, operating system 120 corresponds to Oracle Solaris 10.0 operating system, which provides DTrace utility. In general, DTrace can be used to obtain a global overview of a running system, such as the amount of memory, CPU time, file system and network resources used by the active (application) processes. It can also provide much more fine-grained information, such as a log of the arguments with which a specific function is being called, or a list of the processes accessing a specific file. The Dtrace utility is described in further detail in a document entitled, "Solaris Dynamic Tracing Guide" available from Oracle Corporation and also a book entitled, "DTrace: Dynamic Tracing in Oracle Solaris, Mac OS X and FreeBSD (Oracle Solaris Series)", ISBN-10: 0132091518, Publication Date: Apr. 11, 2011, by Brendan Gregg and Jim Mauro.

According to that utility, one needs to register (or specify) the specific functions or libraries, that are of interest, and OS 120 thereafter traps the invocation of such functions. Such ability to trap invocation of only selective functions minimizes any adverse impact on throughput performance, even though alternative implementations can be chosen to trap invocation of more (including all) functions (e.g., those in selected libraries).

The output generated by OS 120 upon such trapping can be suitably processed to generate report 330, with respect to libraries and functions, as described in sections below.

Identification of such specific libraries (or utilities therein) presents different challenges with respect to statically linked libraries and dynamically linked libraries. As is well known in the relevant arts, the statically linked libraries are included into the executable while compiling (generating machine/object code from corresponding source code from higher level programming languages such as C, etc.) and linking (generating an executable file from potentially multiple object codes/files). With static linking, the library gets embedded into the executable itself.

In contrast, dynamically linked libraries are not included in the executable file. The executable file/code may include references to those which were specified during the compilation and linking, and are thus commonly used associated with shared libraries (i.e., a library that can be potentially shared by different user applications or application processes). The operating system links the referenced library prior to execution of the user application (i.e., before instantiation for execution of the corresponding application process).

The dynamically linked libraries for a running (executing) application can be determined (at any time instance) during run time by invocation of PLDD command in Solaris 10 Operating System environment. Thus, even if run-time analysis program 150 is executed when application process 110 is operative, the PLDD command can be used to determine all the dynamically linked libraries. Several aspects of the present invention operate in conjunction with such dynamically linked libraries, as described in sections below.

A different set of challenges are presented with 'dynamically loaded libraries'. In general, the specific dynamically loaded library need not be known prior to instantiation of application process, and application process 110 can determine the specific library to load during execution (based on the program logic internal to the user application). Thus, a dynamically loaded library is not referenced in the executable, but directly loaded and used by the program at execution time. These libraries may be specified as inputs while initiating execution of the user application or determined by execution logic during the execution time. Therefore, these libraries may not even be available (exist) at compile time. In Solaris 10.0 operating system libraries are dynamically loaded using calls such as "dlopen" (an example of a system call to dynamically load a library). The specific library to open is specified by indicating the corresponding file name as an argument to the dlopen system call.

In the context of Solaris 10 Operating system, the "dlopen" internally uses a sequence of "open" and "mmap" systems calls to dynamically load the specified library. Run-time analysis program 150 traps this sequence of system calls using Dtrace facility, to detect the event of library being dynamically loaded by the running program that is being monitored. Whenever this is detected the name of the library that is being dynamically loaded is recorded and this data is further checked during the post processing phase to ascertain whether the usage library has any compatibility issue in the later version of the Operating system.

Now turning to the challenges with respect to dynamically linked libraries, one general problem with usage of libraries in large/enterprise applications is that many libraries are often marked for potential use by an application program, but only some of them are actually used (i.e., at least one of the function in the library being invoked). For example in Solaris 10, the command "pldd" can be used on a running process to obtain the list of dynamically linked libraries for a running program. The implementation uses this command inside a shell script to determine the dynamically linked list of libraries that may be potentially used by the program. It may not be possible to determine upfront (i.e., before execution) whether all of the marked libraries would be actually used during run-time. Therefore, the absence of support (presence) for specific libraries marked for potential use, is not necessarily a problem. A problem is thus deemed to exist for a vendor only if a library marked for potential use is actually used by the user application during execution.

Now turning to the challenges with respect to dynamically loaded libraries, it is generally required to identify such dynamically loaded libraries. The facilities available for such identification typically depends on the operating environment (including the operating system), and any/all such available facilities can be suitably used for determining the dynamically loaded libraries. In case of Solaris 10.0 operating system, the dynamic loading is effected by using function calls such as "dlopen".

The operation of run-time analysis program 150 using the above noted concepts in an embodiment, is described below in further detail.

7. Underlying Concepts Related to Example Embodiment

FIG. 3B is a flowchart illustrating the operation of run-time analysis program 150 in an embodiment. The flowchart is described with respect to the blocks of FIGS. 1 and 3 merely for illustration. However, many of the features can be implemented in other environments also without departing from the scope and spirit of several aspects of the present invention, as will be apparent to one skilled in the relevant arts by reading the disclosure provided herein. The flow chart begins in step 351, in which control immediately passes to step 360.

In step 360, run-time analysis program 150 identifies the libraries loaded for application process 110. In one embodiment implemented in the context of Oracle Solaris 10.0 operating system, a 'pldd' command is used to identify (from OS 120) libraries linked dynamically to application process 110. The output of pldd indicates the dynamically linked libraries. However this list may not have the dynamically loaded library which has been loaded using functions such as dlopen.

In step 370, run-time analysis program 150 determines the utilities requiring monitoring. In case of dynamically linked libraries, database 310 may be queried to determine the utilities within the identified libraries that require monitoring. In case of libraries that are entirely missing (i.e., not supported in the later version of the operating system), those libraries require monitoring. In case of libraries that are modified in the later version, only those utilities of the library (but not the entire library) that have been changed are required to be monitored. In an embodiment, all libraries loaded dynamically by the application processes, and child processes of the application processes, are deemed to require monitoring.

In step 380, run-time analysis program 150 registers the determined utilities with the operating system. In the case of Solaris 10.0 operating system, the DTRACE utility is used to register the various utilities that are required to be monitored. However, the corresponding facilities provided in other operating environments can be used, to achieve a similar effect.

In step 390, run-time analysis program 150 receives notification of use of a utility. Thus, if any function in a missing/registered library is invoked, the invocation is trapped. Similarly, if a registered function is invoked, the corresponding information is also trapped. The operating system may similarly be used for detecting the use of other resources as well, as described below with examples.

In step 395, run-time analysis program 150 incorporates the information of use of a utility in the report. It should be understood that the loading of a dynamic loaded library by the application being monitored would imply the automatic use of such a library, and accordingly the loading of such a library is included in the log. In one embodiment, operating system 120 traps each instance of invocation of a registered utility and provides a log of all such uses. Run-time analysis program 150 thereafter processes the information in the log to provide an understandable report. The flowchart ends in step 399.

The description is continued with respect to some of the implementation details for the features described above. In particular, as noted above, the registration of step 380 may be performed using DTRACE feature of Solaris 10.0 operating system in that environment. The content of a script used for such registration is illustrated below with examples.

8. Script for Libraries/Function

FIG. 4 illustrates a portion of a script used for registering the specific functions and libraries that are determined to be incompatible. The content of the script is generated by run-time analysis program 150 based on querying of OS 120 (using PLDD command) for dynamically linked libraries, and thereafter checking in database 310 for those libraries and/or specific functions therein, which are incompatible with identical usage in a later version of the operating system.

Each line between 410 and 440 indicates the registration of a corresponding library (e.g., libglib-2.0. so.0.400.1 of line 410) with respect to an application process having process identifier (PID) of 1886. The keyword 'Entry' indicates that invocation of any function within the library be trapped. Lines 441-443 indicate the specific output to be provided to the script upon occurrence of such trap. In particular, the process id, the name of the module/library, and the name of the function are provided to run-time analysis program 150 for further processing. This particular section in the script represents a scenario where a set of libraries (one per each line) are removed, upgraded or moved to a different location in the newer version of the Operating system (Oracle Solaris 11)

Lines 450-460 similarly indicates the corresponding output to be provided to the script when a function within libc.so.1 is invoked. Thus, the lines between 450-460 represent a scenario in which a number of internal functions (Private or Deprecated) of the library have been removed but the library continues to exist in newer version of the operating system. Since number of functions removed were more than a few, the script was generated to detect usage of all functions from this library and record it. This would make sure that the size of the generated script remained manageable. The output was refined further with query from the database to eliminate any functions that have not changed in the newer version of the operating system.

On the other hand, lines 470-475 indicate the specific functions (e.g., "_1cH_CimplWnew_atexit_implemented6F_b_") within a library (libCrun.so.1), which are to be trapped (corresponding to a situation when a library is supported in a future version, but at least some of the functions therein are not identically usable in the later version).

OS 120 generates an output (also shown specified by lines 441-443, 450-460, etc.) when any of the events represented by the script of FIG. 4 occur. It should be appreciated that multiple occurrences of the same event-type (i.e., that represented by a corresponding line of FIG. 4) causes corresponding number of outputs to be provided to run-time analysis program 150. All such outputs may be suitably processed to generate understandable reports.

It should be appreciated that run-time analysis program 150 may similarly instruct OS 120 to monitor opening of any dynamically loaded libraries. In particular, another script (using portions of the logic shown in Appendix A) may request OS 120 to trap all invocations of DLOPEN, and examine the output of such trap (e.g., the input parameters to DLOPEN to check whether a file representing a library is sought to be retrieved, based on appropriate file name extension) to determine whether a library is sought to be dynamically loaded. As noted above, the mere loading of such a library is deemed a use of that utility, and thus the event may be logged for inclusion in the eventual report based on the results of querying database 310.

Furthermore, database 310 can be queried for any specific functions of interest within such a dynamically loaded library, and such functions may also be recorded as described above with respect to FIG. 4. Report 330 accordingly contains the corresponding recorded information.

9. Report

FIG. 5 depicts a portion of such a report after consolidation of similar outputs. It may be readily observed that lines 510, 520, 530 and 540 respectively are caused due to the registrations represented by lines 420, 440, 430 and 450-460 of FIG. 4.

It should be appreciated that report 330 contains information related to only that common duration in which both run-time analysis program 150 and application process 110 are operative. The application process can be specified to be monitored by run-time analysis program 150 by corresponding process identifier (uniquely identifying the process) or selected through a Graphical User Interface, and run-time analysis program 150 may thereafter operate as described above (including querying the operating system, generating scripts, registering the various utilities of interest using the scripts, and generating the report from the logs).

Thus, from examination of report 330 represented by FIG. 5, vendors of user application corresponding to application process 110 may recognize possible issues in compatibility with later versions of an operating system, and suitably develop further versions of the application to address such incompatibilities. It may be readily appreciated that incompatibilities with dynamically linked libraries are also identified in view of run-time operation of the features described above.

However, additional challenges are often presented with child processes that are often created by (parent) processes. According to an aspect of the present invention at least some of the compatibility related information is readily ascertained, as described below with examples.

10. Child Processes

In general, when a child process starts, it loads each of the linked library that it requires. The DTRACE facility noted above, does not provide a direct method for trapping the event of dynamic loading of the library by the child processes spawned by the process that is being monitored. By studying the sequence of kernel calls that the OS makes to load the library, it was observed that a library the OS provides, internally translates the load request into a sequence of "open" and "mmap" kernel calls with certain arguments passed around. As is well known, kernel is a part of a operating system, but executed in a protected mode outside of the user space. The kernel further is typically associated with direct control of the hardware resources.

Thus, a script (shown in Appendix A, in further detail) is generated, and executed by a program when the monitoring of the parent process is sought to be started. In an embodiment, a Java program is executed to initiate monitoring of the parent/child processes, and such program executes the script which runs as a separate process. The script registers the interested sequence with DTRACE, thereby helping in trapping occurrences of such a sequence of events to detect the top level event of library being loaded by a parent process or child processes of the parent process. The script is shown referring to progenyof (1886)), indicating that the events with respect to the child processes of parent process having identifier 1886, are monitored.

This script also has additional logic to ensure that the sequence is from the process or child of the process that is being monitored and also to filter out certain kind of files (for example java jar files, which are generally not affected by upgrade to a higher level version of the OS) or from certain internal directories used for temporary storage or caching (/proc, /var/cache) etc.

Once the loading of libraries is detected using such kernel calls, the data in database 310 may be examined to determine any incompatibility issues with respect to identical usage of the library (e.g., if it is missing/unsupported) or functions therein.

The approach demonstrated in Appendix A can be further extended to provide more features, shown demonstrated associated with the parent process, as will be apparent to one skilled in the relevant arts. Furthermore, alternative embodiments can be implemented where the Operating System is itself designed to trap various events of interest, that occur due to the operation of child process (similar to those explained with respect to the parent process).

While the description of above is provided substantially with respect to functions and libraries, the approaches can be extended to cover other types of utilities such as fonts, symbolic links, etc., as described below with examples.

11. Fonts

In an embodiment implemented with respect to Solaris 10.0 operating system, the various system calls made to Kernel and the operating system are examined (using DTRACE) to determine when the specific fonts are accessed or symbolic links used. It may be appreciated that fonts are generally stored in the form of files and thus the calls are monitored for accessing the specific files storing the content representing the fonts. The arguments of open( ) and close( ) calls may be examined for determining whether the corresponding font is accessed. If the arguments indicate files representing the font data, the corresponding font is deemed to have been accessed.

Thus, a vendor may be able to identify potential incompatibilities, when an application needs to be migrated to execute on another version (new in the above embodiments) of the operating system. The description is continued with respect to a digital processing system in which various features are operative when the corresponding executable modules are executed.

12. Digital Processing System

Figure 6:
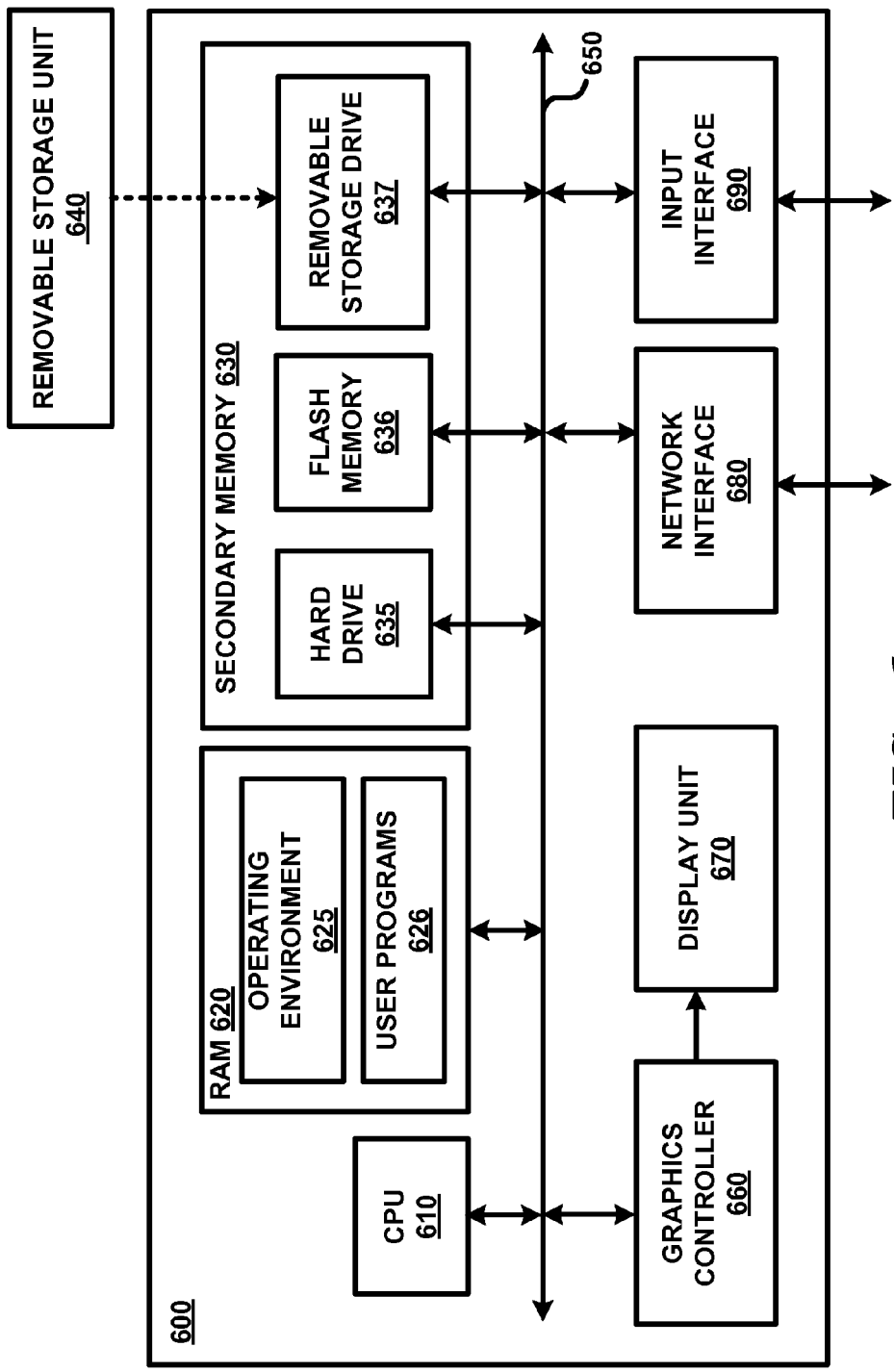
FIG. 6 is a block diagram illustrating the details of a digital processing system in which several features of the present invention can be implemented.

FIG. 6 is a block diagram illustrating the details of digital processing system 600 in which several aspects of the present invention are operative by execution of appropriate executable modules. Digital processing system 600 may correspond to computing system 100. Digital processing system 600 may contain one or more processors (such as a central processing unit (CPU) 610), random access memory (RAM) 620, secondary memory 630, graphics controller 660, display unit 670, network interface 680, and input/output interface 690. All the components except display unit 670 may communicate with each other over communication path 650, which may contain several buses as is well known in the relevant arts.

CPU 610 may execute instructions stored in RAM 620 to provide several features of the present invention. CPU 610 may contain multiple processing units, with each processing unit potentially being designed for a specific task. Alternatively, CPU 610 may contain only a single general-purpose processing unit. Execution of such instructions may provide each of application process 110, run-time analysis program 150 and operating system 120.

RAM 620 may receive instructions from secondary memory 630 using communication path 650. RAM 620 is shown currently containing software instructions constituting shared environment 625 and/or user programs 626. Operating environment 625 contains utilities shared by user programs, and such shared utilities include operating system 120, virtual machines, etc., which provide a (common) run-time environment for execution of user programs/applications (including run-time analysis program 150). User programs 626 contain run-time analysis program 150 and application process 110.

Graphics controller 660 generates display signals (e.g., in RGB format) to display unit 670 based on data/instructions received from CPU 610. Display unit 670 contains a display screen to display the images defined by the display signals. Input/output interface 690 includes input as well as output devices to enable a user to interact with system 600, for example, to start execution of modules representing run-time analysis program 150. Network interface 680 provides the physical, electrical and protocol implementations that enable system 600 to communicate with other systems using protocols such as TCP/IP.

Secondary memory 630 (representing a non-transitory storage/medium) may contain hard drive 635, flash memory 636, and removable storage drive 637. Secondary memory 630 may store data and software instructions (for example, for performing the steps of FIG. 2), which enable digital processing system 600 to provide several features in accordance with the present invention, as described above.

Some or all of the data and instructions may be provided on removable storage unit 640, and the data and instructions may be read and provided by removable storage drive 637 to CPU 610. Floppy drive, magnetic tape drive, CD-ROM drive, DVD Drive, Flash memory, removable memory chip (PCMCIA Card, EPROM) are examples of such removable storage drive 637.

Removable storage unit 640 may be implemented using medium and storage format compatible with removable storage drive 637 such that removable storage drive 637 can read the data and instructions. Thus, removable storage unit 640 includes a computer readable storage medium having stored therein computer software and/or data. However, the computer (or machine, in general) readable storage medium can be in other forms (e.g., non-removable, random access, etc.).

In this document, the term "computer program product" is used to generally refer to secondary memory 630. These computer program products are means for providing software to digital processing system 600. CPU 610 may retrieve the software instructions, and execute the instructions to provide various features of the present invention described above.

It should be understood that numerous specific details, relationships, and methods are set forth to provide a full understanding of the invention. For example, many of the functions units described in this specification have been labeled as modules/blocks in order to more particularly emphasize their implementation independence.

Reference throughout this specification to "one embodiment", "an embodiment", or similar language means that a particular feature, structure, or characteristic described in connection with the embodiment is included in at least one embodiment of the present invention. Thus, appearances of the phrases "in one embodiment", "in an embodiment" and similar language throughout this specification may, but do not necessarily, all refer to the same embodiment.

Furthermore, the described features, structures, or characteristics of the invention may be combined in any suitable manner in one or more embodiments. In the above description, numerous specific details are provided such as examples of programming, software modules, user selections, network transactions, database queries, database structures, hardware modules, hardware circuits, hardware chips, etc., to provide a thorough understanding of embodiments of the invention.

13. CONCLUSION

While various embodiments of the present invention have been described above, it should be understood that they have been presented by way of example only, and not limitation.

Thus, the breadth and scope of the present invention should not be limited by any of the above-described exemplary embodiments, but should be defined only in accordance with the following claims and their equivalents.

It should be understood that the figures and/or screen shots illustrated in the attachments highlighting the functionality and advantages of the present invention are presented for example purposes only. The present invention is sufficiently flexible and configurable, such that it may be utilized in ways other than that shown in the accompanying figures.

Further, the purpose of the following Abstract is to enable the Patent Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the present invention in any way.

APPENDIX A

```
#pragma D option destructive
#pragma D option quiet
BEGIN
{
self->true=1;
self->newfile=0;
self->filename="NULL.NULL";
self->openfd=0;
self->mmapfd=0;
self->tmpfile=NULL;
}
syscall::open*:entry
/(zonename == "global") && (uid == 100) && (execname == "soffice.bin") && (pid == 1886 ||
progenyof(1886)) && (pid != 1821 && !progenyof(1821))/
{
self->tmpfile = arg0;
}
syscall::open*:return
/(zonename == "global") && (uid == 100) && (execname == "soffice.bin") && (pid == 1886 ||
progenyof(1886)) && (pid != 1821 && !progenyof(1821)) && self->tmpfile != NULL/
{
self->openfd=(int)arg1;
self->newfile=1;
self->filename=copyinstr(self->tmpfile);
self->tmpfile=NULL;
}
syscall::mmap*:entry
/(zonename == "global") && (uid == 100) && (execname == "soffice.bin") && (pid == 1886 ||
progenyof(1886)) && (pid != 1821 && !progenyof(1821)) && self->newfile != 0 && self-
>openfd > 2 && self->filename != NULL && self->filename != "NULL.NULL" && strstr(self-
>filename,"/proc/") == NULL && strstr(self->filename,"/var/cache/") == NULL && strstr(self-
>filename,".jar")==NULL/
{
self->mmapfd=(int)arg4;
}
syscall::mmap*:return
/(zonename == "global") && (uid == 100) && (execname == "soffice.bin") && (pid == 1886 ||
progenyof(1886)) && (pid != 1821 && !progenyof(1821)) && self->mmapfd > 2 && self-
>openfd == self->mmapfd && self->filename != NULL && self->filename != "NULL.NULL"
&& strstr(self->filename,"/proc/") == NULL && strstr(self->filename,"/var/cache/") == NULL
&& strstr(self->filename,".jar")==NULL/
{
printf("%s|%d|%d|%s|%s|%s\n",zonename, uid, pid, execname,curpsinfo->pr_psargs,self-
>filename);
self->newfile=0;
self->openfd=0;
self->mmapfd=0;
self->filename="NULL.NULL";
}
tick-1min
/++n == 10/
{
exit(0);
}
```

What is claimed is:

1. A method of determining compatibility of user applications with a second version of an operating system, wherein said user applications are designed for execution in a first version of said operating system, said method being performed in a computing system executing said first version of said operating system, said method comprising:

detecting, by a run-time analysis program, that an application process has initiated usage of a utility provided by said first version of said operating system, wherein said application process is created by execution of a first user application of said user applications in said computing system executing said first version of said operating system, wherein said using and said detecting are performed in a run-time duration of said application process upon being created in said computing system executing said first version of said operating system, said utility being one of many utilities provided to applications executing based on said first version of said operating system;

checking, by said run-time analysis program, whether usage of said detected utility, if identical as with said first version, is incompatible with said second version of said operating system, said checking being performed upon said detecting of the initiation of usage of said utility by said application process in said run-time duration; and if said usage of said detected utility is determined to be incompatible with said second version of said operating system, including information on the incompatibility in a report, wherein said run-time analysis program executes along with said application process on said first version of said operating system while performing said detecting and said checking, wherein said run-time analysis program performs said detecting and said checking for each of a subset of utilities used by said application process during said run-time duration, wherein said subset of utilities are contained in said many utilities provided to applications executing based on said first version of said operating system.

2. The method of claim 1, wherein said checking comprises:

maintaining data indicating incompatibility information related to each of a plurality of utilities, wherein each of said plurality of utilities is contained in said many utilities provided by said first version of said operating system and usage of each of said plurality of utilities, identical as with said first version, is incompatible with said second version, said incompatibility information of each of said plurality of utilities including an identifier of the utility and the description of incompatibility with said second version; and examining said data indicating incompatibility information to determine whether identical usage of said detected utility is incompatible with said second version, wherein usage of said detected utility is determined to be incompatible only if the corresponding information is presented in said data indicating said incompatibility information, wherein said examining is performed for each of said subset of utilities, wherein said including includes said identifier of said detected utility and the description in said report based on the data indicating incompatibility information.

3. The method of claim 2, wherein said utility comprises a library and said initiation comprises invocation of any function of said library, wherein said first version of said operating system is designed to trap invocation of any functions of a library upon registration of the library for monitoring, said method further comprises:

ascertaining, by said run-time analysis program, a set of libraries indicated to be of potential candidates for use by said application process during execution in said first version;

examining, by said run-time analysis program, said data indicating incompatibility information to determine a subset of libraries which are not supported by said second version, wherein said subset of libraries is contained in said set of libraries and each of said subset of libraries is indicated by said data to be non-existent in said second version;

registering, by said run-time analysis program, each of said subset of libraries for monitoring by said operating system; and including, in said report, information on the specific one of said subset of libraries if any of the functions in the specific library is indicated, by said first version of said operating system, to have been invoked by said application process.

4. The method of claim 3, wherein each function in a first library is corresponding another utility and said initiation comprises invocation of a function in said first library, wherein said operating system is designed to trap invocation of a function only upon registration of the function for monitoring, said method further comprising:

checking, by said run-time analysis program, said data to determine a set of functions contained in said first library, wherein said data indicates that identical usage of each of said set of functions is incompatible with said second version;

registering, by said run-time analysis program, each of said set of functions of said first library for monitoring by said operating system;

including, by said run-time analysis program in said report, information on the specific one of said set of functions of said first library if the specific function is indicated, by said operating system, to have been invoked by said application process.

5. The method of claim 4, where each of said set of libraries is specified for dynamic linking in said user application, wherein said first library is dynamically loaded by said application process during execution, wherein said detecting and said checking are performed by said run-time analysis program after said first library is dynamically loaded by said application process during execution.

6. The method of claim 2, wherein said incompatibility is one of (A) said second version requiring a syntax or semantics by applications, for invoking said utility, compared to in said first version; (B) non-existence of said utility in said second version of said operating system; or (C) said utility, upon execution in said first version of said operating system, being designed to generate an output that is not suitable in said second version.

7. The method of claim 5, further comprises:

registering, by said run-time analysis program, with said first version of said operating system that invocation of a system call to dynamically load a library is to be trapped; and receiving from said operating system, by said run-time analysis program, a trap output when said application process invokes said system call requesting dynamic loading of said first library, said trap output indicating an identifier of said first library, wherein said checking and including are performed by said run-time analysis program in response to receiving said trap output.

8. The method of claim 2, wherein said application process is designed to create a sub-process, said method further comprising including in said report compatibility information with respect to a second set of libraries loaded by said sub-process.

9. The method of claim 8, further comprising monitoring execution of kernel level calls for the loading of said second set of libraries.

10. The method of claim 2, wherein a font and a directory are also respective utilities and said initiation with respect to said font and said directory comprises accessing data representing said font and accessing content of said directory respectively, wherein absence of support for said font and change of a path at which said directory is present in said second version are included in said report.

11. A non-transitory machine readable medium carrying one or more sequences of instructions for causing a computing system to determine compatibility of user applications with a second version of an operating system, wherein said user applications are designed for execution with a first version of said operating system executing in said computing system, wherein execution of said one or more sequences of instructions by one or more processors in said computing system causes said computing system to perform the actions of:

detecting, by a run-time analysis program, that an application process has initiated usage of a utility provided by said first version of said operating system, wherein said application process is created by execution of a first user application of said user applications in said computing system executing said first version of said operating system, and wherein said using and said detecting are performed in a run-time duration of said application process upon being created in said computing system executing said first version of said operating system, said utility being one of many utilities provided to applications executing based on said first version of said operating system;

checking, by said run-time analysis program, whether usage of said detected utility, if identical as with said first version, is incompatible with said second version of said operating system, said checking being performed upon said detecting of the initiation of usage of said utility by said application process in said run-time duration; and if said usage of said detected utility is determined to be incompatible with said second version of said operating system, including information on the incompatibility in a report, wherein said run-time analysis program executes along with said application process on said first version of said operating system while performing said detecting and said checking, wherein said run-time analysis program performs said detecting and said checking for each of a subset of utilities used by said application process during said run-time duration, wherein said subset of utilities are contained in said many utilities provided to applications executing based on said first version of said operating system.

12. The non-transitory machine readable medium of claim 11, wherein said checking comprises:

maintaining data indicating incompatibility information related to each of a plurality of utilities, wherein each of said plurality of utilities is contained in said many utilities provided by said first version of said operating system and usage of each of said plurality of utilities, identical as with said first version, is incompatible with said second version, said incompatibility information of each of said plurality of utilities including an identifier of the utility and the description of incompatibility with said second version; and examining said data indicating incompatibility information to determine whether identical usage of said detected utility is incompatible with said second version, wherein usage of said detected utility is determined to be incompatible only if the corresponding information is presented in said data indicating said incompatibility information, wherein said examining is performed for each of said subset of utilities, wherein said including includes said identifier of said detected utility and the description in said report based on the data indicating incompatibility information.

13. The non-transitory machine readable medium of claim 12, wherein said incompatibility is one of (A) said second version requiring a syntax or semantics by applications, for invoking said utility, compared to in said first version; (B) non-existence of said utility in said second version of said operating system; or (C) said utility, upon execution in said first version of said operating system, being designed to generate an output that is not suitable in said second version.

14. The non-transitory machine readable medium of claim 12, wherein said application process is designed to create a sub-process, said machine readable medium further comprising including in said report compatibility information with respect to a second set of libraries loaded by said sub-process.

15. The non-transitory machine readable medium of claim 12, wherein said utility comprises a library and said initiation comprises invocation of any function of said library, wherein said first version of said operating system is designed to trap invocation of any functions of a library upon registration of the library for monitoring, said machine readable medium further comprising:

ascertaining, by said run-time analysis program, a set of libraries indicated to be of potential candidates for use by said application process during execution in said first version;

examining, by said run-time analysis program, said data indicating incompatibility information to determine a subset of libraries which are not supported by said second version, wherein said subset of libraries is contained in said set of libraries and each of said subset of libraries is indicated by said data to be non-existent in said second version;

registering, by said run-time analysis program, each of said subset of libraries for monitoring by said operating system; and including, in said report, information on the specific one of said subset of libraries if any of the functions in the specific library is indicated, by said first version of said operating system, to have been invoked by said application process.

16. The non-transitory machine readable medium of claim 15, wherein each function in a first library is corresponding another utility and said initiation comprises invocation of a function in said first library, wherein said operating system is designed to trap invocation of a function only upon registration of the function for monitoring, said machine readable medium further comprising:
  checking, by said run-time analysis program, said data to determine a set of functions contained in said first library, wherein said data indicates that identical usage of each of said set of functions is incompatible with said second version;
  registering, by said run-time analysis program, each of said set of functions of said first library for monitoring by said operating system;
  including, by said run-time analysis program in said report, information on the specific one of said set of functions of said first library if the specific function is indicated, by said operating system, to have been invoked by said application process.

17. The non-transitory machine readable medium of claim 16, where each of said set of libraries is specified for dynamic linking in said user application,
  wherein said first library is dynamically loaded by said application process during execution,
  wherein said detecting and said checking are performed by said run-time analysis program after said first library is dynamically loaded by said application process during execution.

18. The non-transitory machine readable medium of claim 17, further comprising:
  registering, by said run-time analysis program, with said first version of said operating system that invocation of a system call to dynamically load a library is to be trapped; and
  receiving from said operating system, by said run-time analysis program, a trap output when said application process invokes said system call requesting dynamic loading of said first library, said trap output indicating an identifier of said first library,
  wherein said checking and including are performed, by said run-time analysis program, in response to receiving said trap output.

19. A digital processing system comprising:
  a processor; and
  a machine readable medium storing one or more sequences of instructions,
  wherein execution of said one or more sequences of instructions by said processor causes said digital processing system to perform the actions of:
    detecting, by a run-time analysis program, that an application process has initiated usage of a utility provided by said first version of said operating system, wherein said application process is created by execution of a first user application of said user applications in said computing system executing said first version of said operating system, and wherein said using and said detecting are performed in a run-time duration of said application process upon being created in said computing system executing said first version of said operating system, said utility being one of many utilities provided to applications executing based on said first version of said operating system;
    checking, by said run-time analysis program, whether usage of said detected utility, if identical as with said first version, is incompatible with said second version of said operating system, wherein said checking is performed in response to said detecting of usage of said utility by said application process in said run-time duration; and
    if said usage of said detected utility is determined to be incompatible with said second version of said operating system, including information on the incompatibility in a report,
  wherein said run-time analysis program executes along with said application process on said first version of said operating system while performing said detecting and said checking,
  wherein said run-time analysis program performs said detecting and said checking for each of a subset of utilities used by said application process during said run-time duration,
  wherein said subset of utilities are contained in said many utilities provided to applications executing based on said first version of said operating system.

20. The digital processing system of claim 19, wherein said checking comprises:
  maintaining data indicating incompatibility information related to each of a plurality of utilities, wherein each of said plurality of utilities is contained in said many utilities provided by said first version of said operating system and usage of each of said plurality of utilities, identical as with said first version, is incompatible with said second version,
  said incompatibility information of each of said plurality of utilities including an identifier of the utility and the description of incompatibility with said second version; and
  examining said data indicating incompatibility information to determine whether identical usage of said detected utility is incompatible with said second version, wherein usage of said detected utility is determined to be incompatible only if the corresponding information is presented in said data indicating said incompatibility information,
  wherein said examining is performed for each of said subset of utilities,
  wherein said including includes said identifier of said detected utility and the description in said report based on the data indicating incompatibility information.

21. The digital processing system of claim 19, wherein said incompatibility is one of (A) said second version requiring a syntax or semantics by applications, for invoking said utility, compared to in said first version; (B) non-existence of said utility in said second operating system; or (C) said utility, upon execution in said first version of said operating system, being designed to generate an output that is not suitable in said second version.

* * * * *